(12) United States Patent
Kim et al.

(10) Patent No.: US 11,845,655 B2
(45) Date of Patent: *Dec. 19, 2023

(54) CARBON NANOTUBE DISPERSION AND METHOD FOR PREPARING THE SAME

(71) Applicant: LG CHEM, LTD., Seoul (KR)

(72) Inventors: Dong Hyun Kim, Daejeon (KR); Houng Sik Yoo, Daejeon (KR); Jin Myung Cha, Daejeon (KR); Gye Min Kwon, Daejeon (KR); Hyun Sik Chae, Daejeon (KR); Dong Hyun Cho, Daejeon (KR); Sang Hoon Choy, Daejeon (KR); Hyeon Choi, Daejeon (KR); Hyung Suk Cho, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/993,733

(22) Filed: Nov. 23, 2022

(65) Prior Publication Data

US 2023/0085066 A1 Mar. 16, 2023

Related U.S. Application Data

(63) Continuation of application No. 17/049,477, filed as application No. PCT/KR2019/006907 on Jun. 7, 2019, now Pat. No. 11,542,164.

(30) Foreign Application Priority Data

Jun. 11, 2018 (KR) .......................... 10-2018-0066857

(51) Int. Cl.
C01B 32/174 (2017.01)
H01M 4/62 (2006.01)
B82Y 30/00 (2011.01)
B82Y 35/00 (2011.01)
B82Y 40/00 (2011.01)

(52) U.S. Cl.
CPC ........... *C01B 32/174* (2017.08); *H01M 4/625* (2013.01); *B82Y 30/00* (2013.01); *B82Y 35/00* (2013.01); *B82Y 40/00* (2013.01); *C01B 2202/02* (2013.01); *C01B 2202/32* (2013.01)

(58) Field of Classification Search
CPC .............. C01B 32/174; C01B 2202/02; C01B 2202/32; C01B 2202/28; C01B 32/158; C01B 32/159; C01B 32/16; C01B 32/162; C01B 32/164; C01B 32/166; C01B 32/168; C01B 32/17; C01B 32/172; C01B 32/176; C01B 32/178; C01B 2202/00; C01B 2202/04; C01B 2202/06; C01B 2202/08; C01B 2202/10; C01B 2202/20; C01B 2202/22; C01B 2202/24; C01B 2202/26; C01B 2202/30; C01B 2202/34; C01B 2202/36; H01M 4/625; H01M 4/139; B82Y 30/00; B82Y 35/00; B82Y 40/00; Y02E 60/10; C01P 2006/40; C09C 1/44; C09C 1/56; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

U.S. PATENT DOCUMENTS

| 11,542,164 B2* | 1/2023 | Kim ........................ C09C 1/56 |
| 2005/0002851 A1 | 1/2005 | McElrath et al. |
| 2009/0032777 A1 | 2/2009 | Kitano et al. |
| 2009/0224211 A1 | 9/2009 | Storr et al. |
| 2016/0155948 A1 | 6/2016 | Murase et al. |

FOREIGN PATENT DOCUMENTS

| JP | WO2006132254 A1 | 1/2009 |
| JP | 2010195671 A | 9/2010 |
| JP | 2015188774 A | 11/2015 |
| KR | 10-20160133711 A | 11/2016 |
| KR | 10-20180054355 A | 5/2018 |
| WO | 2015/170918 A1 | 11/2015 |
| WO | 2017/099358 A1 | 6/2017 |

OTHER PUBLICATIONS

Chang-chun KE et al., "Effect of CNTs as conductive agent on performance of LiFePO4 lithium-ion battery", Journal of Central South University (Science and Technology), 2011, vol. 42, No. 5, pp. 1202-1208.
Liu Qiaoling et al., "Preparation of carbon nanotubes solution and its effects on mechanical properties of cement mortar", Journal of Southeast University (Natural Science Edition), 2014, vol. 55, No. 3, pp. 662-667.
Jing Zhong et al., "Ultrasonically assisted compounding of CNT with polypropylenes of different molecular weights", Polymer, 2016, vol. 107, pp. 130-146.
Al-Hamadani et al., "Stabilzation and dispersion of carbon nanomaterials in aqueous solutions: A review", Separation and Purification Technology, vol. 156, (2015) pp. 861-874.

* cited by examiner

*Primary Examiner* — Daniel C. McCracken
(74) *Attorney, Agent, or Firm* — BRYAN CAVE LEIGHTON PAISNER LLP

(57) ABSTRACT

The present invention relates to a carbon nanotube dispersion including carbon nanotubes, a polymer dispersant containing an amine, a phenolic compound including two or more aromatic rings, and an aqueous solvent, wherein the polymer dispersant and the phenolic compound including two or more aromatic rings are included in a weight ratio of 100:1 to 100:90, and having low viscosity and a small change of viscosity over time.

10 Claims, No Drawings

CARBON NANOTUBE DISPERSION AND METHOD FOR PREPARING THE SAME

CROSS-REFERENCE TO RELATED APPLICATIONS

The present application is a Continuation of U.S. patent application Ser. No. 17/049,477, filed on Oct. 21, 2020, now allowed, which is a National Phase entry pursuant to 35 U.S.C. § 371 of International Application No. PCT/KR2019/006907 filed on Jun. 7, 2019, and claims priority to and the benefit of Korean Patent Application No. 10-2018-0066857, filed on Jun. 11, 2018, in the Korean Intellectual Property Office, the disclosures of which are incorporated herein in their entirety by reference.

FIELD

The present invention relates to a carbon nanotube dispersion and a method for preparing the same, more particularly, to a carbon nanotube dispersion having low viscosity and a small change of viscosity over time and a method for preparing the same.

BACKGROUND

Demand for secondary batteries as an energy source has been rapidly increased as technology development and demand with respect to mobile devices have increased. Among such secondary batteries, a lithium secondary battery having high energy density and voltage, long cycle life, and a low self-discharge ratio has been commercialized and widely used. In addition, as an electrode for such a lithium secondary battery with high capacity, study on methods for manufacturing an electrode having higher energy density per unit volume by increasing electrode density is being actively conducted.

Generally, electrodes with high density are formed by molding electrode active material particles having a size of several μm to tens of μm by a high-pressure press and during a molding process, particles may be deformed and spaces between particles may decrease to easily deteriorate the permeability to an electrolyte.

In order to solve such problems, a conductive agent having excellent electroconductivity and strength is used during manufacturing an electrode. The conductive agent is positioned between electrode active material particles and, even during undergoing a molding process, micropores between active material particles may be maintained so that an electrolyte may easily permeate and has excellent electroconductivity so that resistance in an electrode may decrease. The use of carbon nanotube as a conductive agent, which is a fiber-type carbonaceous conductive agent and may form an electrically conductive path in an electrode and further decrease electrode resistance, is increasing.

The carbon nanotube which is a kind of minute carbon fiber is a tube type carbon fiber having a thickness with a diameter of 1 μm or less, and the application and practical use thereof in diverse fields are expected due to high conductivity, tensile strength and heat resistance, resulted from its specific structure. However, carbon nanotubes have problems with low dispersibility and the generation of an agglomeration phenomenon because of strong van der Waals interactions with each other due to the high specific surface area thereof.

In order to solve such problems, a method of dispersing carbon nanotubes in a dispersing medium through mechanical dispersing treatment such as ultrasonic wave treatment has been suggested. However, in case of the mechanical dispersing method, there are problems with agglomeration of carbon nanotubes as soon as the application of ultrasonic waves is finished.

Accordingly, the development of a method for preparing a carbon nanotube dispersion, which has improved dispersibility of carbon nanotubes, low viscosity and suppressed viscosity increase over time, is required.

SUMMARY

An aspect of the present invention is to solve the defects of the conventional technique and is to provide a carbon nanotube dispersion including a polymer dispersant containing an amine and a phenolic compound including two or more aromatic rings, and accordingly, having excellent dispersibility, low viscosity and a small change of viscosity over time.

In addition, another aspect of the present invention is to provide a negative electrode slurry composition for a lithium secondary battery, including the carbon nanotube dispersion.

In addition, another aspect of the present invention is to provide a method for preparing the carbon nanotube dispersion.

According to an embodiment of the present invention, there is provided a carbon nanotube dispersion including carbon nanotubes (CNT), a polymer dispersant containing an amine, a phenolic compound including two or more aromatic rings, and an aqueous solvent, wherein the polymer dispersant and the phenolic compound including two or more aromatic rings are included in a weight ratio of 100:1 to 100:90.

According to another embodiment of the present invention, there is provided an electrode slurry composition for a lithium secondary battery, including the carbon nanotube dispersion.

According to further another embodiment of the present invention, there is provided a method for preparing the carbon nanotube dispersion, including preparing a mixture by mixing carbon nanotubes, a polymer dispersant containing an amine, a phenolic compound including two or more aromatic rings, and an aqueous solvent; and milling the mixture.

The carbon nanotube dispersion of the present invention includes a polymer dispersant containing an amine and a phenol compound with a specific structure and has excellent dispersibility of carbon nanotubes, low viscosity and a small change of viscosity over time, and thus, the storage and use of the carbon nanotube dispersion is favorable.

BEST MODE FOR CARRYING OUT THE INVENTION

Detailed Description

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the disclosure are only for explaining exemplary embodiments and do not intend to limit the present invention. The singular forms are intended to include the plural forms as well, unless the context clearly indicates otherwise.

It will be understood that the terms "comprises" and/or "comprising," when used in the present disclosure, specify the presence of stated features, numerals, steps, elements, or combinations thereof, but do not preclude the presence or addition of one or more other features, numerals, steps, elements, or combinations thereof.

In the present disclosure, "%" means wt %, unless the context clearly indicates otherwise.

In the present disclosure, an average particle size "$D_{50}$" means a particle size corresponding to 50% of a volume accumulation amount. The $D_{50}$ may be measured using, for example, a laser diffraction method. The laser diffraction method may generally measure a particle size in a range from submicron to several mm, and results with high reproduction and high resolution may be obtained.

In the present disclosure, "specific surface area" is measured by a BET method, and particularly may be computed from a nitrogen gas absorption amount at a liquid nitrogen temperature (77K) using BELSORP-mino II of BEL Japan Co.

Hereinafter, the present invention will be described specifically.

The carbon nanotube dispersion according to the present invention includes carbon nanotubes (CNT), a polymer dispersant containing an amine, a phenolic compound including two or more aromatic rings, and an aqueous solvent, wherein the polymer dispersant and the phenolic compound including two or more aromatic rings are included in a weight ratio of 100:1 to 100:90.

Carbon Nanotube Dispersion

Hereinafter, each component of the carbon nanotube dispersion of the present invention will be explained specifically.

(1) Carbon Nanotube

The term "carbon nanotube" used in the present invention is a secondary structure which is formed by gathering the whole or part of the carbon nanotube units into a bundle type, and in the carbon nanotube unit, a graphite sheet has a cylinder shape with a nano-size diameter and has a $sp^2$ bond structure. In this case, according to the rolling angle and structure of the graphite sheet, conductor or semiconductor properties may be shown. The carbon nanotube unit may be classified into a single-walled carbon nanotube (SWCNT), a double-walled carbon nanotube (DWCNT), and a multi-walled carbon nanotube (MWCNT) according to the number of bonds forming a wall.

The term "bundle type" used in the present disclosure, unless otherwise referred to differently, refers to the arrangement of a plurality of carbon nanotube units such that the length directions of the axes of the units have substantially the same orientation, or a secondary shape in a bundle or rope type, in which the units are twisted or entangled after being arranged. A "non-bundle type or entangled type" refers to an entangled state without a certain shape such as the bundle type or rope type of the carbon nanotube units.

The carbon nanotube has high conductivity but has high cohesiveness due to van der Waals force generated between carbon nanotubes. If conductive agents are agglomerated, a conductive path may not be appropriately formed, and a relatively greater amount of conductive agents is required, and the amount of an active material decreases to rather degrade the performance of an electrode. Accordingly, there is difficulty in commercializing the carbon nanotube as a conductive agent.

Since the carbon nanotube dispersion according to the present invention includes a polymer dispersant containing an amine, and a phenolic compound including two or more aromatic rings, the viscosity of an aqueous carbon nanotube dispersion may be significantly decreased, and its change over time may be suppressed. Accordingly, if applied to the electrode of a lithium secondary battery, high conductivity may be shown due to the high conductivity of the carbon nanotube.

Particularly, if the carbon nanotube dispersion according to the present invention is applied to the preparation of an electrode slurry, carbon nanotubes may be homogeneously positioned between active materials, and accordingly, minute spaces between electrode active materials may be maintained constant during manufacturing an electrode by applying an electrode slurry, drying and pressing. In addition, since the carbon nanotubes are uniformed distributed without agglomeration, a conductive path may be sufficiently formed with a small amount of carbon nanotubes.

The carbon nanotube dispersion according to an embodiment of the present invention may include one or more among single-walled, double-walled, and multi-walled carbon nanotube units as the carbon nanotube and may particularly include a multi-walled carbon nanotube.

The carbon nanotube may have a specific surface area (BET) of 210 $m^2/g$ or less, particularly, a specific surface area (BET) of from 30 $m^2/g$ to 200 $m^2/g$, more particularly, from 100 $m^2/g$ to 200 $m^2/g$. If the specific surface area (BET) of the carbon nanotube satisfies the above-described range, the amount of the carbon nanotube included in the carbon nanotube dispersion may be increased when compared with a case using the carbon nanotube having a specific surface area greater than the above-described range.

The average particle size ($D_{50}$) of the carbon nanotubes may be, for example, from 3 μm to 300 μm, particularly, from 10 μm to 200 μm, more particularly, from 50 μm to 150 μm. In order to measure the average particle size of the carbon nanotube, the particle size of each carbon nanotube unit may be measured using a laser diffraction method.

The carbon nanotube may be included in 2 parts by weight to 10 parts by weight, particularly, 3 parts by weight to 8 parts by weight, more particularly, 3 parts by weight to 6 parts by weight, based on 100 parts by weight of the conducive agent dispersion.

Since the carbon nanotubes may be uniformly dispersed in the carbon nanotube dispersion according to an embodiment of the present invention, the carbon nanotube may be present in a greater amount when compared with the above-described conventionally commonly used range of the carbon nanotube dispersion. If a carbon nanotube dispersion having a smaller amount of the carbon nanotube is used for the preparation of an electrode slurry, the solid content of an electrode slurry thus manufactured may decrease, a thickness (wet thickness) after applying the electrode slurry and prior to drying thereof may become large, and a rolling ratio measured after performing drying and rolling treatments may increase, and there may be a large difference of a thickness ratio before and after the drying and rolling. As described above, if the rolling ratio increases, the compositions in a slurry including a positive electrode active material may be damaged during processing, and accordingly, defects of degrading the performance of a battery may arise.

(2) Polymer Dispersant Containing an Amine and Phenolic Compound Including Two or More Aromatic Rings The carbon nanotube dispersion according to the present invention includes a polymer dispersant containing an amine and a phenolic compound including two or more aromatic rings together in order to improve the dispersibility of the carbon nanotubes. In the carbon nanotube dispersion, the polymer dispersant containing an amine and the phenolic compound including two or more aromatic rings are dispersants and play the role of increasing the dispersibility of the carbon nanotube, particularly, show suppressing effects of the change of viscosity over time.

According to the study of the present inventors, with the inclusion of the phenolic compound including two or more aromatic rings in the carbon nanotube dispersion, dispersibility was improved when compared with the carbon nanotube dispersion using only the conventional dispersant, and the particle agglomeration of a slurry composition was small, a sedimentation rate was small, and adhesion with a separator membrane was improved.

When compared with the conventional technique, the phenolic compound including two or more aromatic rings may decrease the viscosity of a carbon nanotube dispersion, particularly, an aqueous carbon nanotube dispersion, and markedly improve the increase in viscosity over time, due to a bulky structure produced by the two or more aromatic rings and a hydroxyl group included in a phenol group.

In case of using phenol compounds including only one aromatic ring (for example, dopamine, gallic acid, pyrogallol, catechol, etc.), the improving effect of the viscosity and the restraining effect of the viscosity change over time of the dispersion are insufficient.

Meanwhile, if a specific polymer dispersant containing an amine in a polymer structure is applied as the polymer dispersant, further improving effect of viscosity increase and restraining effect of the viscosity change over time may be shown. The polymer dispersant containing an amine may be dissolved in water and may include, for example, one or more selected from the group consisting of polyvinylpyrrolidone, polyacrylic acid hydrazide, poly-N-vinyl-5-methoxazolidon, N-alkyl polyimine, N-acetyl polyimine, polyacrylamide, poly-L-lysine hydrobromide, benzyl-dodecyl-dimethylammonium chloride, and polyethylenimine.

Meanwhile, the phenolic compound containing two or more aromatic rings may include one or more structures selected from the group consisting of a phenol structure, a catechol structure, a gallol structure, and a naphthol structure, in one or more among the aromatic rings, particularly, one or more structures selected from the group consisting of a catechol structure and a gallol structure in one or more of the aromatic rings. The phenol structure is a bonded structure of one hydroxyl group to a benzene ring, the catechol structure is a bonded structure of two hydroxyl groups to a benzene ring, the gallol structure is a bonded structure of three hydroxyl groups to a benzene ring, and the naphthol structure is a bonded structure of one hydroxyl group to naphthalene.

If the phenolic compound including two or more aromatic rings include the above-described structure, the interaction between the aromatic ring and the carbon nanotube and the interaction due to the hydrogen bond between the —OH group of the phenolic compound and the polymer dispersant in the carbon nanotube dispersion may keep appropriate balance, and the restraining effect of the viscosity decrease and the viscosity increase according to time of the carbon nanotube dispersion may be shown.

Specific examples of the phenolic compound including two or more aromatic rings may include one or more selected from the group consisting of baicalin, luteolin, taxifolin, myricetin, quercetin, rutin, catechin, epigallocatechin, gallate, butein, piceatannol and tannic acid, preferably, tannic acid, quercetin, or combinations thereof.

In an embodiment of the present invention, the aromatic ring included in the phenolic compound including two or more aromatic rings, may be one aromatic ring which is not fused with another aromatic ring or a fused structure of two aromatic rings to each other, but a fused structure of three or more aromatic rings to each other may not be included.

That is, in the range of the phenolic compound including two or more aromatic rings, a case of including the fused structure of three or more aromatic rings in a molecular structure may be excluded.

In case where the phenolic compound including two or more aromatic rings includes the fused structure of three or more aromatic rings in a molecular structure, the fused structure of three or more aromatic rings may show strong bonding force with carbon nanotubes greater than an appropriate degree in the carbon nanotube dispersion, and the agglomeration between carbon nanotubes may be induced, and accordingly, the dispersibility improvement of the carbon nanotubes may be inadequate. In addition, the balance of the interaction between the aromatic ring and the carbon nanotube and the interaction due to the hydrogen bond between —OH of the phenolic compound and the polymer dispersant in the above-described carbon nanotube dispersion may be lost, and it could be difficult to show appropriate decreasing effect of the viscosity and restraining effect of the increase of the viscosity change according to time of the carbon nanotube dispersion.

In case where the phenolic compound including two or more aromatic rings and the polymer dispersant are included in an appropriate weight ratio, both the improving effect of the viscosity and the restraining effect of the viscosity change over time of the dispersant were shown, and in case where the weight ratio of the phenolic compound including two or more aromatic rings and the polymer dispersant deviates from a certain weight ratio, viscosity improving effect was attained but the restraining effect of the viscosity change over time was insufficient.

The polymer dispersant and the phenolic compound including two or more aromatic rings may be included in a weight ratio of 100:1 to 100:90, particularly, 100:10 to 100:80, more particularly, 100:20 to 100:70. In case where the polymer dispersant and the phenolic compound including two or more aromatic rings are included in the weight ratio in the carbon nanotube dispersion, the carbon nanotubes are uniformly dispersed in the carbon nanotube dispersion, thereby showing low viscosity and maintaining the viscosity to a certain degree over time.

The carbon nanotube dispersion may include 11 parts by weight to 100 parts by weight, particularly, 11 parts by weight to 70 parts by weight, more particularly, 15 parts by weight to 50 parts by weight, of the polymer dispersant and the phenolic compound including two or more aromatic rings in total based on 100 parts by weight of the carbon nanotube.

If the polymer dispersant and the phenolic compound are included in an excessive amount than the above range, the conductivity of an electrode to which the carbon nanotube dispersion may be applied may be degraded due to the excessive amount of the dispersant, and the polymer dispersant and the phenolic compound may act as impurities in the electrode, and if the amount is less than the above range, the improving effect of the dispersibility, the decreasing effect of the viscosity and the restraining effect of the viscosity change over time may be insufficient.

(3) Aqueous Solvent

The solvent is a dispersing medium for dispersing the carbon nanotubes, the polymer dispersant and the phenolic compound including two or more aromatic rings and is used for dispersing in advance to be supplied as a carbon nanotube dispersion in order to prevent the agglomeration in case where carbon nanotubes in a powder state is directly used for preparing an electrode slurry composition.

The solvent may dissolve or disperse the carbon nanotubes, the polymer dispersant and the phenolic compound including two or more aromatic rings to a certain degree or more. The aqueous solvent may be, for example, water, and the aqueous solvent may be included in an amount to provide an electrode slurry composition with an appropriate viscosity considering the coating properties of the electrode slurry composition which is prepared using the carbon nanotube slurry composition later.

The carbon nanotube dispersion of the present invention, including such components has excellent dispersibility, low viscosity, and a small increasing degree of the viscosity over time.

The carbon nanotube dispersion may have a viscosity of 0.1 to 5 cps, particularly, 0.1 to 4 cps, if measured at 25° C. and 1 rpm using a viscometer (product of TOKI Co., viscometer TV-22). If the carbon nanotube dispersion has a viscosity in this range, an electrode slurry may be prepared more smoothly using the same, and an electrode slurry including the carbon nanotube dispersion may have an appropriate viscosity for forming an electrode.

In addition, the carbon nanotube dispersion, if left standing for one week at 25° C., may have the increasing rate of viscosity of 100% or less, particularly, 50% or less, more particularly, 20% or less.

Method for Preparing Carbon Nanotube Dispersion

Hereinafter, a method for preparing a carbon nanotube dispersion will be explained. The method for preparing a conductive agent dispersion according to the present invention includes (1) preparing a mixture by mixing carbon nanotubes, a polymer dispersant, a phenolic compound including two or more aromatic rings, and an aqueous solvent; and (2) milling the mixture.

In step (1), a mixture is prepared by mixing carbon nanotubes, a polymer dispersant, a phenolic compound including two or more aromatic rings, and an aqueous solvent.

The preparation step of the mixture may be performed under temperature conditions by which physical properties including the viscosity of the mixture are not changed by the evaporation of the aqueous solvent. For example, the step may be performed at a temperature of 50° C. or less, more particularly, 5° C. to 50° C.

In step (2), the mixture is dispersed to prepare the carbon nanotube dispersion.

The milling may be performed by a method using a ball mill, bead mill, a disc mill or a basket mill, a high pressure homogenizer, etc. More particularly, the milling may be performed by a milling method using a disc mill or a high pressure homogenizer.

During milling by the disc mill, the size of beads may be suitably determined according to the kind and amount of the carbon nanotube and the kind of the dispersant, and particularly, the diameter of the beads may be 0.1 mm to 5 mm, more particularly, 0.5 mm to 4 mm. In addition, the bead milling process may be performed in a rate of 2,000 rpm to 10,000 rpm, more particularly, in a rate of 5,000 rpm to 9,000 rpm.

The milling by the high pressure homogenizer may be performed by pressurizing the mixture using, for example the plunger pump of the high pressure homogenizer and extruding the mixture through the gaps of a valve for homogenization, and by the force of cavitation, shear, impact, explosion, etc., while passing through the gaps.

The milling process may be performed according to the dispersion degree of the carbon nanotube dispersion and may particularly be performed for 30 minutes to 120 minutes, more particularly, 60 minutes to 90 minutes.

Electrode Slurry Composition

In addition, the present invention provides an electrode slurry composition for a lithium secondary battery, including the carbon nanotube dispersion and an electrode active material.

The electrode slurry composition for a lithium secondary battery may be a positive electrode slurry composition or a negative electrode slurry composition, particularly, a negative electrode slurry composition.

The electrode slurry composition for a lithium secondary battery may include the carbon nanotube dispersion, a positive electrode active material or a negative electrode active material as an electrode active material, a binder, and a solvent and/or other additives, as necessary.

As the positive electrode active material, positive electrode active materials well-known in the art may be used, without limitation, for example, lithium cobalt-based oxides, lithium nickel-based oxides, lithium manganese-based oxides, lithium iron phosphor oxides, lithium manganese cobalt-based oxides or combinations thereof, may be used. Particularly, as the positive electrode active materials, $LiCoO_2$, $LiNiO_2$, $LiMn_2O_4$, $LiCoPO_4$, $LiFePO_4$ and $LiNi_aMn_bCo_cO_2$ (where, $0<a<1$, $0<b<1$, $0<c<1$), without limitation.

As the negative electrode active material, one or more kinds of negative electrode active materials selected from the group consisting of natural graphite, artificial graphite, carbonaceous material; lithium-containing titanium composite oxide (LTO), metals (Me) of Si, Sn, Li, Zn, Mg, Cd, Ce, Ni or Fe; alloys composed of the metals (Me); oxides (MeOx) of the metals (Me); and composites of the metals (Me) and carbon. The negative electrode active material may be included in 60 to 98 wt %, more preferably, 70 to 98 wt % based on the total solid weight excluding the solvent from a negative electrode slurry.

The binder is a component playing the role of assisting attachment of an active material with a conductive agent, and attachment to a current collector, and is generally added in 1 to 30 wt % based on the total weight of the mixture including an electrode active material. Examples of such binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, styrene-butadiene rubber, fluorine rubber, or various copolymers.

As the solvent, organic solvents including N-methyl pyrrolidone (NMP), dimethylformamide (DMF), acetone, dimethylacetamide, etc., water, or the like may be used, and these solvents may be used alone or as a mixture of two or more. The amount used of the solvent may be enough if the electrode active material, the binder, and the conductive agent may be dissolved and dispersed considering the application thickness of the slurry and production yield.

A viscosity controller may be carboxymethylcellulose, or polyacrylic acid, and the viscosity of the electrode slurry may be controlled so that the preparation of the electrode slurry and the applying process on the electrode current collector may become easier by the addition thereof.

A filler is a component suppressing the expansion of the electrode and is optionally used, and may include the use any fillers without specific limitation, only if fibrous material not inducing chemical change in a battery may be used, and for example, olefin-based polymers such as polyethylene and polypropylene; fibrous materials such as glass fiber and carbon fiber may be used.

If the electrode slurry composition is a positive electrode slurry composition for forming a positive electrode, the positive electrode may be formed by applying the positive electrode slurry composition on a positive electrode current collector, drying and rolling. Otherwise, the positive electrode may be formed by casting the positive electrode slurry on a separate support and laminating a film obtained by exfoliating from the support on the positive electrode current collector.

The thickness of the positive electrode active material layer formed by the positive electrode slurry may be changed according to a loading amount, a loading rate, etc. for applying the positive electrode slurry.

The positive electrode current collector generally has a thickness of 3 μm to 500 μm. The positive electrode current collector may be anyone having high conductivity without inducing chemical change in a battery, without limitation. For example, stainless steel, aluminum, nickel, titanium, fired carbon, or aluminum or stainless steel that is surface-treated with carbon, nickel, titanium, silver, or the like may be used. Also, an uneven surface may be formed on the surface of the positive electrode current collector to improve the bonding strength of the positive electrode active material. The positive electrode current collector may be used in various shapes, such as that of a film, a sheet, a foil, a net, a porous body, a foam body, a non-woven fabric body, and the like.

If the electrode slurry composition is a negative electrode slurry composition for forming a negative electrode, the negative electrode may be formed by applying the negative electrode slurry composition on a negative electrode current collector, drying and rolling. Otherwise, the negative electrode may be formed by casting the negative electrode slurry on a separate support and laminating a film obtained by exfoliating from the support on the negative electrode current collector.

The thickness of the negative electrode active material layer formed by the negative electrode slurry may be changed according to a loading amount, a loading rate, etc. for applying the negative electrode slurry.

The negative electrode current collector generally has a thickness of 3 μm to 500 μm. The negative electrode current collector may be anyone having high conductivity without inducing chemical change in a battery, without limitation. For example, copper, stainless steel, aluminum, nickel, titanium, fired carbon, copper or stainless steel that is surface-treated with carbon, nickel, titanium, silver, or the like, or an aluminum-cadmium alloy may be used. Also, an uneven surface may be formed on the surface of the negative electrode current collector as in the positive electrode current collector to improve the bonding strength of the negative electrode active material, and the negative electrode current collector may be used in various shapes, such as that of a film, a sheet, a foil, a net, a porous body, a foam body, a non-woven fabric body, and the like.

Lithium Secondary Battery

A lithium secondary battery includes a positive electrode, a negative electrode, a separator disposed between the positive electrode and the negative electrode, and an electrolyte. The explanation on the positive electrode and the negative electrode is the same as described above, and the particular explanation thereof will be omitted.

The separator separates the negative electrode and the positive electrode and provides a channel for moving lithium ions, and any separator used as a separator in a typical secondary battery may be used, without specific limitation. Particularly, a separator having low resistance against the moving of electrolyte ions and excellent wetting capacity of an electrolyte is preferable. Particularly, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, may be used, or a laminated structure of two or more layers thereof may be used. Also, a typical porous nonwoven fabric, for example, a nonwoven fiber formed of high melting point glass fibers or polyethylene terephthalate fibers may be used. In addition, in order to secure heat resistance or mechanical strength, a coated separator including a ceramic component or a polymer material may be used, optionally in a single layer or multilayer structure may be used.

The electrolyte may be an organic liquid electrolyte, an inorganic liquid electrolyte, a solid polymer electrolyte, a gel-type polymer electrolyte, a solid inorganic electrolyte, a fused-type inorganic electrolyte, or the like, which may be used for manufacturing a lithium secondary battery, without limitation. Particularly, the electrolyte may include an organic solvent and a lithium salt.

The organic solvent may use any organic solvents which may play the role of a medium through which ions involved in the electrochemical reaction of a battery may move, without limitation. Particularly, as the organic solvent, ester solvents such as methyl acetate, ethyl acetate, γ-butyrolactone, and ε-caprolactone; ether solvents such as dibutyl ether and tetrahydrofuran; ketone solvents such as cyclohexanone; aromatic hydrocarbon solvents such as benzene and fluorobenzene; carbonate solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol solvents such as ethyl alcohol and isopropyl alcohol; nitriles such as R—CN (R is C2 to C20 hydrocarbon group with a linear, branched or cyclic structure); amides such as dimethyl formamide; dioxolans such as 1,3-dioxolane; or sulfolanes. Among them, the carbonate solvents are preferable, and a mixture of a cyclic carbonate with high ion conductivity and high dielectric constant, which enables increasing of charge and discharge capacity of a battery (for example, ethylene carbonate or propylene carbonate) and a linear carbonate compound with a low viscosity (for example, ethyl methyl carbonate, dimethyl carbonate or diethyl carbonate) is more preferable. In this case, the cyclic carbonate and a linear carbonate are used by mixing from about 1:1 to about 1:9 by volume to show excellent performance of an electrolyte.

The lithium salt may use any compounds providing lithium ions used in a lithium secondary battery, without specific limitation. Particularly, the lithium salt may use $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN\ (C_2F_5SO_3)_2$, $LiN\ (C_2F_5SO_2)_2$, $LiN\ (CF_3SO_2)_2$, $LiCl$, $LiI$, $LiB(C_2O_4)_2$, etc. The lithium salt is preferably used in a concentration rage of 0.1 M to 2.0 M. If the concentration of the lithium salt is included in the above range, the electrolyte may have appropriate conductivity and viscosity and may show excellent electrolyte properties, and the lithium ions may move effectively.

In the electrolyte, one or more kinds of additives, for example, a haloalkylene carbonate-based material such as difluoroethylene carbonate, pyridine, triethylphosphite, triethanolamine, cyclic ether, ethylene diamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol or aluminum trichloride, may be further included in addition to the constituent components of the electrolyte to improve life characteristics of a battery, to restrain the decrease of battery capacity, and to improve battery discharge capacity. In this case, the additive may be included in 0.1 wt % to 5 wt % based on the total weight of the electrolyte.

In a lithium secondary battery including an electrode formed using the carbon nanotube dispersion according to the present invention, particularly, in a lithium secondary battery including a negative electrode formed using the carbon nanotube dispersion, carbon nanotubes are uniformly dispersed in the negative electrode, and the amount of the carbon nanotube may be reduced when compared with a case including a conventional conductive agent such as carbon black, thereby showing excellent discharge capacity and output properties stably. As a result, the lithium secondary battery may be usefully used in portable devices including a cellular phone, a laptop computer, and a digital camera, and an electric vehicle field including a hybrid electric vehicle (HEV).

According to another embodiment of the present invention, the lithium secondary battery, a battery module including the lithium secondary battery as a unit cell, and a battery pack including the same may be provided.

The battery module and battery pack may be used as a power of a medium and large sized device of any one of a power tool; an electric car including electric vehicle (EV), a hybrid electric vehicle, and a plug-in hybrid electric vehicle (PEHV); or a power storage system.

EXAMPLES

Hereinafter, the present invention will be described in more detail referring to embodiments. However, the embodiments are only for illustrating the present invention, and the scope of the present invention is not limited thereto.

EXAMPLES

Example 1

4 wt % of a multi-walled carbon nanotube (MWCNT, LG Chem, Co.) having a specific surface area of 185 m$^2$/g and an average particle size ($D_{50}$) of 93 μm, 0.6 wt % of polyvinyl pyrrolidone (PVP, Zhangzhou Huafu Chemical Co.) as a polymer dispersant, 0.2 wt % of tannic acid (Sigma Aldrich Co.) as a phenolic compound including two or more aromatic rings, and water as a solvent were mixed to prepare 200 g of a mixture. Then, 700 g of zirconia beads were mixed therewith and milled for 1 hour under conditions of 8,000 rpm using a disc type mill (Dispermat-CC, VMA-Getzmaan Co.) to prepare a carbon nanotube dispersion.

Example 2

A carbon nanotube dispersion was prepared according to the same method as in Example 1 except for changing the amount of the multi-walled carbon nanotube to 5.14 wt %, the amount of the polyvinyl pyrrolidone to 1.03 wt %, and the amount of the tannic acid to 0.51 wt % in Example 1.

Example 3

A carbon nanotube dispersion was prepared according to the same method as in Example 1 except for changing the amount of the polyvinyl pyrrolidone to 0.75 wt % and the amount of the tannic acid to 0.05 wt % in Example 1.

Example 4

A carbon nanotube dispersion was prepared according to the same method as in Example 1 except for changing the amount of the polyvinyl pyrrolidone to 0.45 wt % and the amount of the tannic acid to 0.35 wt % in Example 1.

Comparative Example 1

A carbon nanotube dispersion was prepared according to the same method as in Example 1 except for excluding the tannic acid and changing the amount of the polyvinyl pyrrolidone to 0.8 wt % in Example 1.

Comparative Example 2

A carbon nanotube dispersion was prepared according to the same method as in Example 1 except for changing the amount of the polyvinyl pyrrolidone to 0.4 wt % and the amount of the tannic acid to 0.4 wt % in Example 1.

Comparative Example 3

A carbon nanotube dispersion was prepared according to the same method as in Example 1 except for using the same amount of carboxymethyl cellulose (Daicel Co.) instead of the polyvinyl pyrrolidone in Example 1.

Experimental Example

The viscosities of the carbon nanotube dispersions of Examples 1 to 4 and Comparative Examples 1 to 3 were measured, and letting them stand at 25° C. for one week, the viscosities were measured again. The results are shown in Table 1 below.

The viscosity was measured at 25° C. in 1 rpm using a viscometer (TV-22, manufactured by TOKI Co.).

TABLE 1

| | Carbon nanotube content (wt %) | Polymer dispersant/ wt % | Phenolic compound including two or more aromatic rings/wt % | Viscosity | |
|---|---|---|---|---|---|
| | | | | After dispersing | After one week |
| Example 1 | 4 | PVP 0.6 | Tannic acid 0.2 | 3.4 | 3.3 |
| Example 2 | 5.14 | PVP 1.03 | Tannic acid 0.51 | 0.4 | 0.4 |
| Example 3 | 4 | PVP 0.75 | Tannic acid 0.05 | 3.8 | 4.3 |
| Example 4 | 4 | PVP 0.45 | Tannic acid 0.35 | 1.8 | 2.5 |
| Comparative Example 1 | 4 | PVP 0.8 | — | 5.8 | 13.6 |
| Comparative Example 2 | 4 | PVP 0.4 | Tannic acid 0.4 | 0.9 | 7.4 |
| Comparative Example 3 | 4 | CMC 0.6 | Tannic acid 0.2 | 5.4 | 10.8 |

Referring to the results of Table 1 above, the carbon nanotube dispersions of Example 1 to 4, which included the phenolic compound including two or more aromatic rings together with the polymer dispersant showed lower viscosity immediately after dispersing carbon nanotubes in an aqueous solvent and particularly, the viscosity increase of the carbon nanotube dispersion according to time was very effectively suppressed when compared with the carbon nanotube dispersion of Comparative Example 1, which included only the polyvinyl pyrrolidone as the polymer dispersant. In addition, when comparing the results of Examples 1 to 4 with those of Comparative Example 2, it could be confirmed that the weight ratio and total amount of the polymer dispersant containing an amine and the phenolic compound including two or more aromatic rings in the carbon nanotube dispersion influenced the viscosity and viscosity change over time of the carbon nanotube dispersions. Particularly, Comparative Example 2 included the polymer dispersant containing an amine and the phenolic compound including two or more aromatic rings in a weight ratio of 1:1, and in this case, an initial viscosity could be lowered when compared with a case of using only the polymer dispersant containing an amine but the suppressing effect of viscosity increase over time could not be practically attained.

Meanwhile, Comparative Example 3 included carboxymethyl cellulose instead of polyvinyl pyrrolidone as the polymer dispersant and included a polymer dispersant other than the polymer dispersant containing an amine together with the phenolic compound including two or more aromatic rings, and a slight decrease of viscosity and suppressing effect of viscosity increase over time were shown but were insignificant when compared with the results of Comparative Example 1. The difference of the results was clear when compared with Example 1 which included the polymer dispersant and the phenolic compound including two or more aromatic rings in the same amount.

Accordingly, it could be confirmed that only if a carbon nanotube dispersion in which carbon nanotubes are dispersed in an aqueous solvent includes the polymer dispersant and the phenolic compound including two or more aromatic rings in a certain weight ratio, low viscosity and the suppress of viscosity increase over time may be achieved.

The invention claimed is:

1. A carbon nanotube dispersion, comprising:
   carbon nanotubes, a polymer dispersant containing an amine, a phenolic compound comprising two or more aromatic rings, and a solvent,
   wherein the carbon nanotube is present in 2 parts by weight to 10 parts by weight, based on 100 parts by weight of the dispersion, and
   the polymer dispersant containing an amine and the phenolic compound comprising two or more aromatic rings are present in a weight ratio of 100:10 to 100:90.

2. The carbon nanotube dispersion according to claim 1, wherein the carbon nanotube has a specific surface area (BET) of 210 $m^2/g$ or less.

3. The carbon nanotube dispersion according to claim 1, wherein the polymer dispersant containing an amine is one or more selected from the group consisting of polyvinylpyrrolidone, polyacrylic acid hydrazide, poly-N-vinyl-5-methoxazolidon, N-alkyl polyimine, N-acetyl polyimine, polyacrylamide, poly-L-lysine hydrobromide, benzyl-dodecyl-dimethylammonium chloride, and polyethylenimine.

4. The carbon nanotube dispersion according to claim 1, wherein the two or more aromatic rings are selected from the group consisting of a phenol structure, a catechol structure, a gallol structure and a naphthol structure.

5. The carbon nanotube dispersion according to claim 1, wherein the phenolic compound comprising two or more aromatic rings does not comprise a fused structure of three or more aromatic rings in a molecular structure.

6. The carbon nanotube dispersion according to claim 1, wherein the phenolic compound comprising two or more aromatic rings is one or more selected from the group consisting of baicalin, luteolin, taxifolin, myricetin, quercetin, rutin, catechin, epigallocatechin, gallate, butein, piceatannol and tannic acid.

7. The carbon nanotube dispersion according to claim 1, wherein the carbon nanotube dispersion comprises the polymer dispersant and the phenolic compound comprising two or more aromatic rings in an amount of 11 parts by weight to 100 parts by weight, in total amount based on 100 parts by weight of the carbon nanotube.

8. The carbon nanotube dispersion according to claim 1, wherein an increasing rate of viscosity of the carbon nanotube dispersion is 50% or less, when left standing for one week at 25° C.

9. An electrode slurry composition for a lithium secondary battery, comprising the carbon nanotube dispersion according to claim 1 and an electrode active material.

10. A method for preparing the carbon nanotube dispersion of claim 1, the method comprising:
    (1) preparing a mixture by mixing the carbon nanotubes, the polymer dispersant containing an amine, the phenolic compound comprising two or more aromatic rings, and the aqueous solvent; and
    (2) milling the mixture.

* * * * *